US012565381B2

(12) United States Patent    (10) Patent No.:   US 12,565,381 B2

Becker et al.    (45) Date of Patent:   Mar. 3, 2026

(54) BLOCK STACKING ARRANGEMENT

(71) Applicant: Jungheinrich Aktiengesellschaft, Hamburg (DE)

(72) Inventors: Michael Becker, Hainburg (DE); Jörg Cavelius, Bad Vilbel (DE); Timm Morawietz, Tholey-Überroth (DE); Markus Liebhaber, Oberursel (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 348 days.

(21) Appl. No.: 18/116,611

(22) Filed: Mar. 2, 2023

(65) Prior Publication Data

US 2023/0278802 A1    Sep. 7, 2023

(30) Foreign Application Priority Data

Mar. 3, 2022   (EP) .................................... 22160002

(51) Int. Cl.
   *B65G 1/14*      (2006.01)
   *F16B 7/04*      (2006.01)
   *B65G 1/04*      (2006.01)

(52) U.S. Cl.
   CPC .............. *B65G 1/14* (2013.01); *F16B 7/0486* (2013.01); *B65G 1/0471* (2013.01)

(58) Field of Classification Search
   CPC ...... B65G 57/302; B65G 1/02; B65G 1/0471; B65G 1/14; A47B 87/0246; F16B 7/0486
   See application file for complete search history.

(56) References Cited

U.S. PATENT DOCUMENTS

| | | | | | |
|---|---|---|---|---|---|
| 3,231,103 | A | * | 1/1966 | Tantlinger | ................ B65G 1/14 |
| | | | | | 211/49.1 |
| 3,680,518 | A | * | 8/1972 | Tabuchi | .................... B60P 7/13 |
| | | | | | 410/71 |
| 9,796,080 | B2 | * | 10/2017 | Lindbo | ................ G06Q 10/083 |
| 10,059,521 | B2 | * | 8/2018 | Swoboda | ............. B65G 59/101 |
| 10,336,540 | B2 | * | 7/2019 | Gravelle | .................. B65G 1/04 |
| 11,678,743 | B2 | * | 6/2023 | Cavelius | .............. B65G 59/062 |
| | | | | | 211/126.6 |

(Continued)

FOREIGN PATENT DOCUMENTS

| | | |
|---|---|---|
| BE | 661 864 | 7/1965 |
| CN | 201506527 | 6/2010 |

(Continued)

OTHER PUBLICATIONS

Europe Extended Search Report conducted in counterpart Europe Appln. No. 22160002.6 (Dec. 22, 2022).

(Continued)

*Primary Examiner* — Patrick D Hawn
(74) *Attorney, Agent, or Firm* — GREENBLUM & BERNSTEIN, P.L.C.

(57)      ABSTRACT

A block stacking arrangement includes multiple container holding spaces; a loading space arranged below the container holding spaces; and a frame arrangement between the container holding spaces and the loading space. The frame arrangement has node elements that are arranged at corners of the container holding spaces, and each pair of two adjacent node elements is releasably connected by a same beam.

16 Claims, 3 Drawing Sheets

(56) References Cited

U.S. PATENT DOCUMENTS

| | | | |
|---|---|---|---|
| 11,767,170 B2* | 9/2023 | Becker | B65G 1/0471 |
| | | | 211/49.1 |
| 11,952,225 B2 | 4/2024 | Harting et al. | |
| 12,110,184 B2* | 10/2024 | Becker | B65G 57/302 |
| 12,110,197 B2* | 10/2024 | Becker | B25J 9/162 |
| 2003/0206789 A1* | 11/2003 | Tai | B65G 1/0414 |
| | | | 414/275 |
| 2018/0148259 A1 | 5/2018 | Gravelle et al. | |
| 2021/0052071 A1 | 2/2021 | Cavelius et al. | |
| 2021/0053777 A1 | 2/2021 | Harting et al. | |
| 2021/0188546 A1* | 6/2021 | Becker | B65G 60/00 |
| 2023/0278788 A1* | 9/2023 | Becker | B65D 21/0215 |
| 2023/0278790 A1* | 9/2023 | Becker | F16B 7/044 |
| | | | 211/182 |
| 2023/0415990 A1* | 12/2023 | Rollwa | B65G 1/0471 |

FOREIGN PATENT DOCUMENTS

| | | | |
|---|---|---|---|
| CN | 105 501 953 | 4/2016 | |
| CN | 209573829 | 11/2019 | |
| CN | 211608757 | 10/2020 | |
| CN | 112407637 | 2/2021 | |
| DE | 21 16 707 | 6/1972 | |
| DE | 4213721 C2 * | 7/1993 | A47B 47/0083 |
| DE | 102013009340 A1 * | 12/2014 | B65G 1/0471 |
| EP | 3 782 928 | 2/2021 | |
| EP | 3 782 930 | 2/2021 | |
| FR | 2132047 | 11/1972 | |
| GB | 1072282 | 6/1967 | |
| JP | 2004026428 | 1/2004 | |

OTHER PUBLICATIONS

China Search Report and Office Action conducted in counterpart China Appln. No. 202310183476.2 (Dec. 31, 2025).

* cited by examiner

BLOCK STACKING ARRANGEMENT

CROSS-REFERENCE TO RELATED APPLICATION

This application claims priority under 35 U.S.C. § 119(a) to Europe Application No. 22 16 0002.6 filed Mar. 3, 2022, the disclosure of which is expressly incorporated by reference herein in its entirety.

BACKGROUND

1. Field of the Invention

The present invention relates to a block stacking arrangement having multiple container holding spaces, a loading space arranged below the container holding spaces, and a frame arrangement between the container holding spaces and the loading space.

2. Discussion of Background Information

Such a block stacking arrangement is known, for example, from EP 3 782 930 A1.

A block stacking arrangement serves to storing a large number of containers. In this case, the containers can be arranged in the form of stacks, each container stack being arranged in a container holding space. The storage of a container in a container holding space takes place from below relative to the direction of gravity, through the loading space, wherein a loading vehicle is used for this purpose. In the same way, the removal of a container from the container holding space is also carried out by the loading vehicle downward relative to the direction of gravity.

The frame arrangement separates the container holding spaces from the loading space. It has several functions in this case. On the one hand, the block stacking arrangement must provide a certain mechanical stability so that the containers are held in the container holding spaces sufficiently securely. On the other hand, it is often also used to receive a holding device which holds the respectively lowermost container of a stack of containers in the container holding space.

A block stacking arrangement and the containers accommodated therein must be matched to each other. If the container holding spaces have an excessively large base area, too much space is lost. Furthermore, it is difficult to hold the containers securely in the container holding spaces at the bottom relative to the direction of gravity. If the containers are too large, they cannot be stored in the container holding spaces.

SUMMARY

Embodiments are directed to a flexible solution for the frame arrangement.

According to embodiments, a block stacking arrangement of the type mentioned at the outset in that the frame arrangement has node elements which are arranged at corners of the container holding spaces. Each pair of two adjacent node elements is releasably connected by the same beam.

As such, there is a separation between the node elements which are arranged at the corners of the container holding spaces and the beams which connect adjacent node elements to one another. Four node elements with four beams accordingly form a rectangle, wherein a plurality of such rectangles then form the frame arrangement. The rectangle then also simultaneously forms an opening through which containers can be moved from below relative to the direction of gravity into the container holding space, or vice versa from the container holding space downwards into the loading space. Since the node elements and the beams are separated from one another, an adaptation to other container sizes can be achieved relatively quickly by choosing other beams. The beams can be designed as planar elements, for example as metal sheets, so that their production is relatively simple and a change in the geometry can be achieved with little effort. The node elements can be used independently of the size of the ground surface of the container holding spaces, so that the same node elements can be used in different embodiments of block stacking arrangements.

A node element is preferably connected in a first direction via a first beam to an adjacent node element, and is connected in a second direction via a second beam to a further, adjacent node element. The two beams do not have to be designed identically. A high flexibility can be achieved via a variation of the beams.

It is particularly preferred in this case that the first beam is longer and thinner than the second beam. The four node elements are then arranged at the corners of a rectangle with a longitudinal side and a transverse side. The first beams are arranged on the longitudinal side and the second beams are arranged on the transverse side. Since the second beam is used to support the block stacking arrangement on a floor, it is thicker and thus more stable than the first beam.

Preferably, for each beam, the node element has an arm and the beam is connected to the arm. The arm of the node element then forms a part of the longitudinal or transverse side of the rectangle. In this way, a relatively high stability can be achieved.

Preferably, the node element has a guide for the beam on at least one arm. This additionally facilitates assembly. The beam can be aligned with the node element with the aid of the guide and then connected to the node element.

Preferably, the beam has a beam end face which is connected to an arm end face of the arm. The connection between the beam and the node element then takes place at the end face. There are thus no protruding or overlapping parts which could interfere during the assembly or during operation of the block stacking, arrangement.

Preferably, the beam has at least one slot-like through-opening which extends substantially in the longitudinal direction of the beam, wherein a joining element is guided through a web between the through-opening and the beam end Face. It is thus possible to install the joining element in such a way that it does not protrude beyond the beam or beyond the node element. The joining element therefore does not impede the operation of the block stacking arrangement later.

The node element preferably has a body which is designed as a cast part, A cast part can be produced relatively easily and has the necessary mechanical stability.

A post is preferably arranged between adjacent container holding spaces, a node element forming a stand device for the post. The posts serve to stabilize a container stack which is arranged in a container holding space. It is not absolutely necessary here for a post to be arranged at each corner of the container holding space. In many cases, it is sufficient if a post is arranged on mutually diagonally opposite corners of the container holding space. The node element then forms the base for the post, so to speak. Since the node element is stable enough to be able to absorb the necessary forces, sufficient stability is provided by the node element.

Preferably, the node element has a contact surface with a bore. The post is supported on the contact surface. The bore forms a through channel through which lines or other functional elements can be guided.

A container holding device is preferably arranged between each container holding space and the loading space, said container holding device having a flap which can be pivoted about a horizontal axis, with the flap being mounted in a node element. The node element thus performs a further function. It serves to support at least part of the container holding device.

Preferably, the node element has an opening on its lower side relative to the direction of gravity through which a flap actuation mechanism acts on the flap. The node element permits, for example, the passage of a holding finger which keeps the flap open when a container stack is lowered in order to take out a container. The flap also allows the passage of an element which effects an opening of the flap. The opening is adapted to the respective flap actuation mechanism.

The flap is preferably held in the node element by a flap holding element which is fastened in the node element and which has a recess which receives the flap when the flap is pivoted from a holding position into a release position. When the flap is in its release position, there is, in simplified terms, a smooth surface along which a container can slide. The flap does not protrude so that jamming of the container on the flap can be prevented when the container is to be removed from the container holding space.

The flap holding element preferably forms an abutment for a closing spring acting on the flap. The closing spring loads the flap in a direction in which it projects into an opening between the container holding space and the loading space. If the flap holding element also forms an abutment for the closing spring, the installation of the flap with all of its functionalities is relatively simple.

Preferably, the flap holding element projects beyond at least one end face. The flap bolding element then forms a guide on which a beam can be brought to rest in order to align it on the node element.

Embodiments are directed to a block stacking arrangement that includes multiple container holding spaces; a loading space arranged below the container holding spaces; and a frame arrangement between the container holding spaces and the loading space. The frame arrangement has node elements that are arranged at corners of the container holding spaces, and each pair of two adjacent node elements is releasably connected by a same beam.

According to embodiments, a node element can be connected, in a first direction via a first beam, to an adjacent node element and, in a second direction via a second beam, to a further adjacent node element. The first beam can be longer and thinner than the second beam.

In other embodiments, the node element may have an arm for each beam, and the beam may be connected to the arm. The node element may have a guide for the beam on at least one arm. The beam can have a beam end face which is connected to an arm end face of the arm. Further, the beam can have at least one slot-like through-opening extending substantially in the longitudinal direction of the beam, and a joining element may be guided through a web between the through-opening and the beam end face.

According to other embodiments, the node element may have a body which is formed as a cast part.

In still other embodiments, a post can be arranged between adjacent container holding spaces, and a node element may form a stand device for the post. Further, the node element may have a contact surface with a bore.

In accordance with still yet other embodiments, the block stacking arrangement can further include a container holding device arranged between each container holding space and the loading space, and the container holding device having a flap that is pivotable about a horizontal axis. The can be mounted in a node element. The node element may have an opening on its lower side relative to the direction of gravity through which a flap actuation mechanism acts on the flap. Further, the flap can be held in the node element by a flap holding element which is fastened in the node element and which can have a recess which receives the flap, when the flap is pivoted from a holding position into a release position. The flap holding element may form an abutment for a closing spring acting on the flap. Further, the flap holding element can protrude beyond at least one end face.

Other exemplary embodiments and advantages of the present invention may be ascertained by reviewing the present disclosure and the accompanying drawing.

BRIEF DESCRIPTION OF THE DRAWINGS

The invention is described below with reference to a preferred exemplary embodiment in conjunction with the drawing. In the figures.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
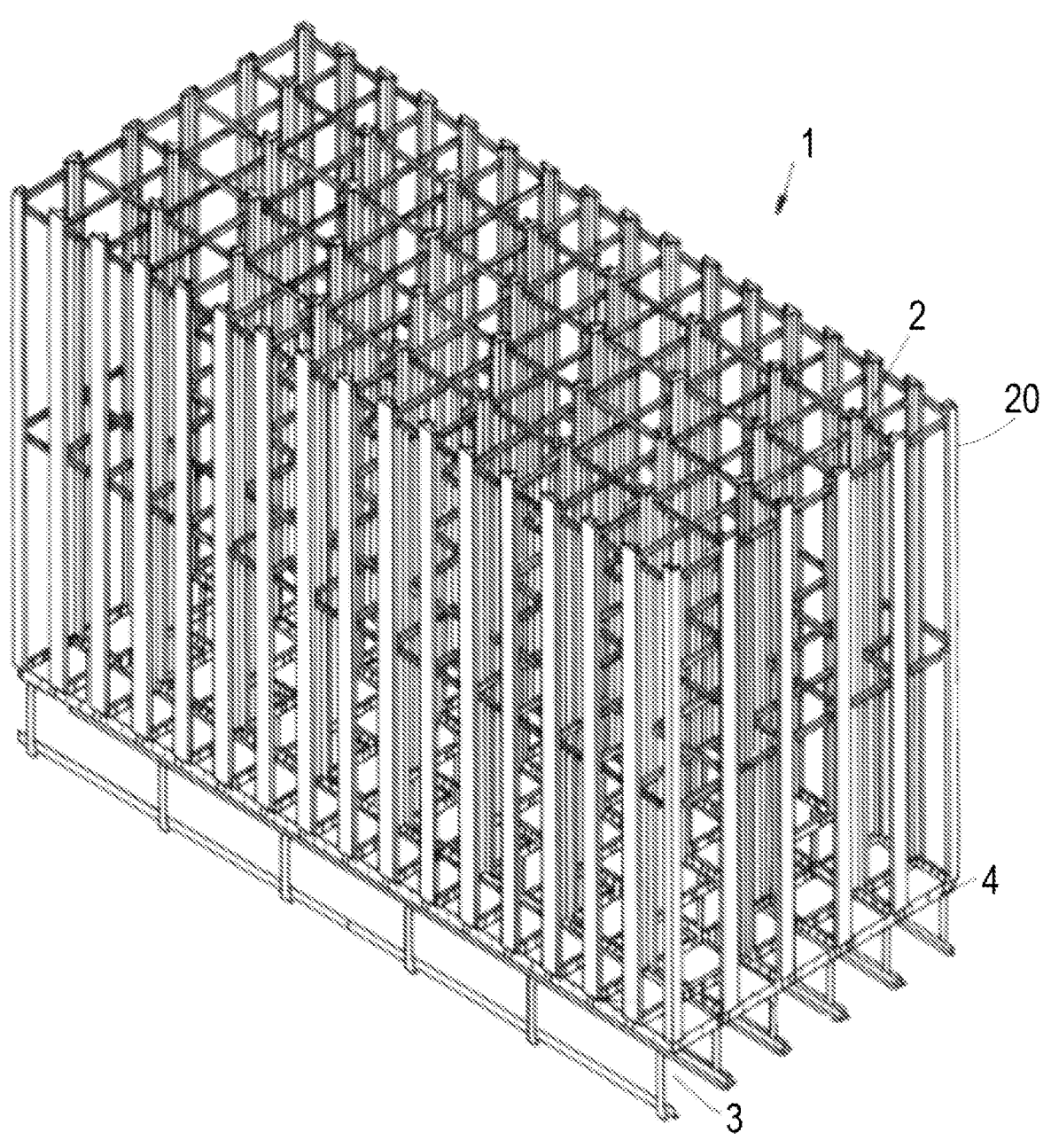
FIG. 1 shows is a highly schematic representation of a block stacking arrangement.
Figure 2:
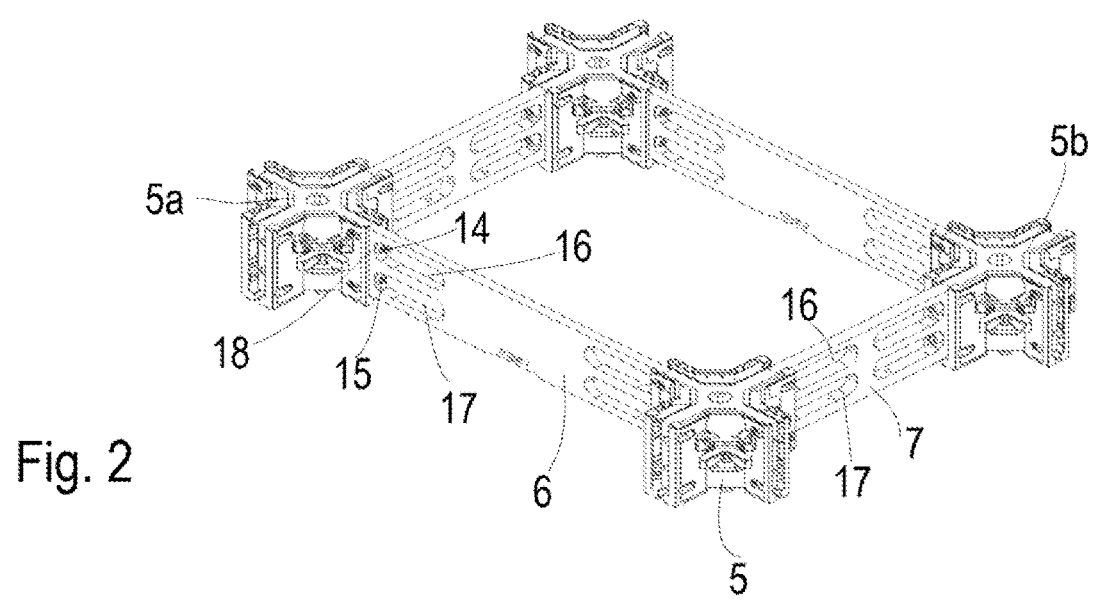
FIG. 2 shows a part of a frame arrangement.

FIG. 1 shows a highly schematic view of a block stacking arrangement having multiple container holding spaces 2 and a loading space 3 arranged below the container holding spaces. A frame arrangement 4 is arranged between the container holding spaces 2 and the loading space 3. FIG. 2 shows a part of this frame arrangement 4.

Figure 3:
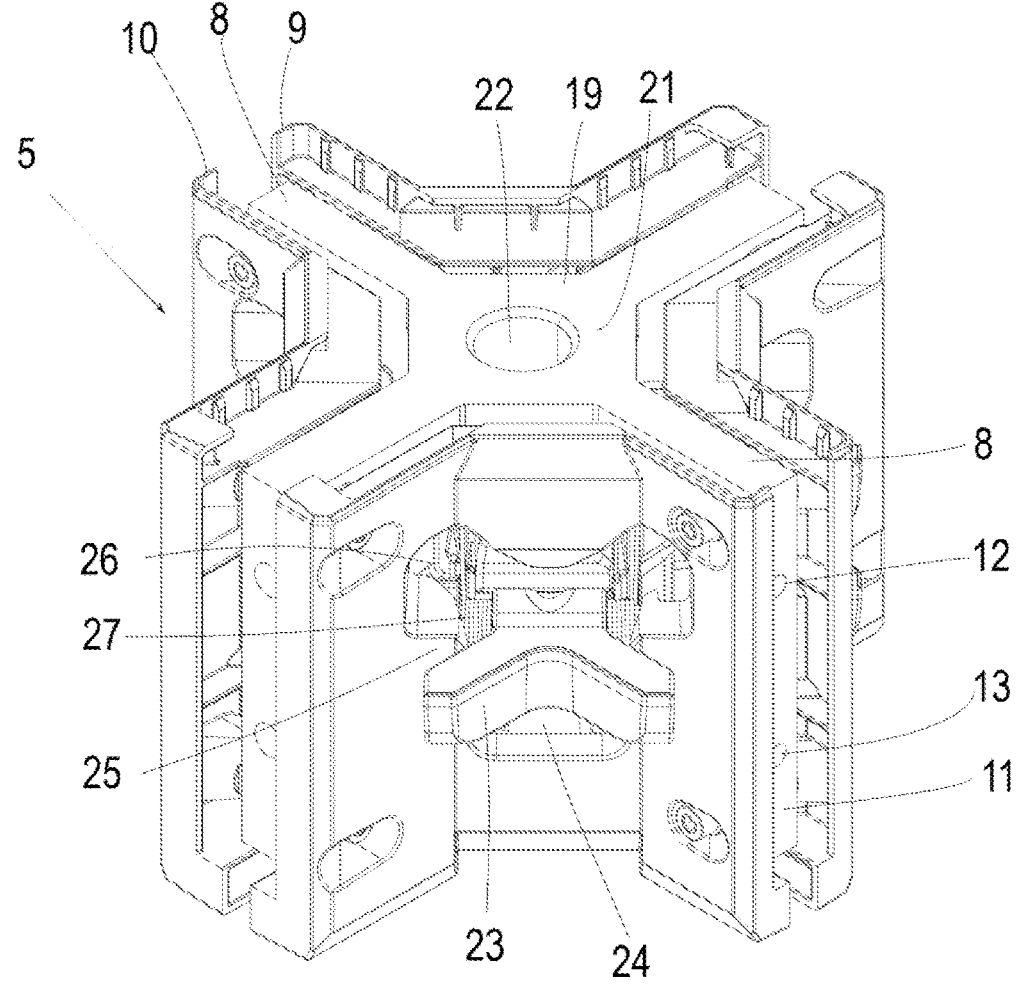
FIG. 3 shows a node element in a perspective view.
Figure 4:
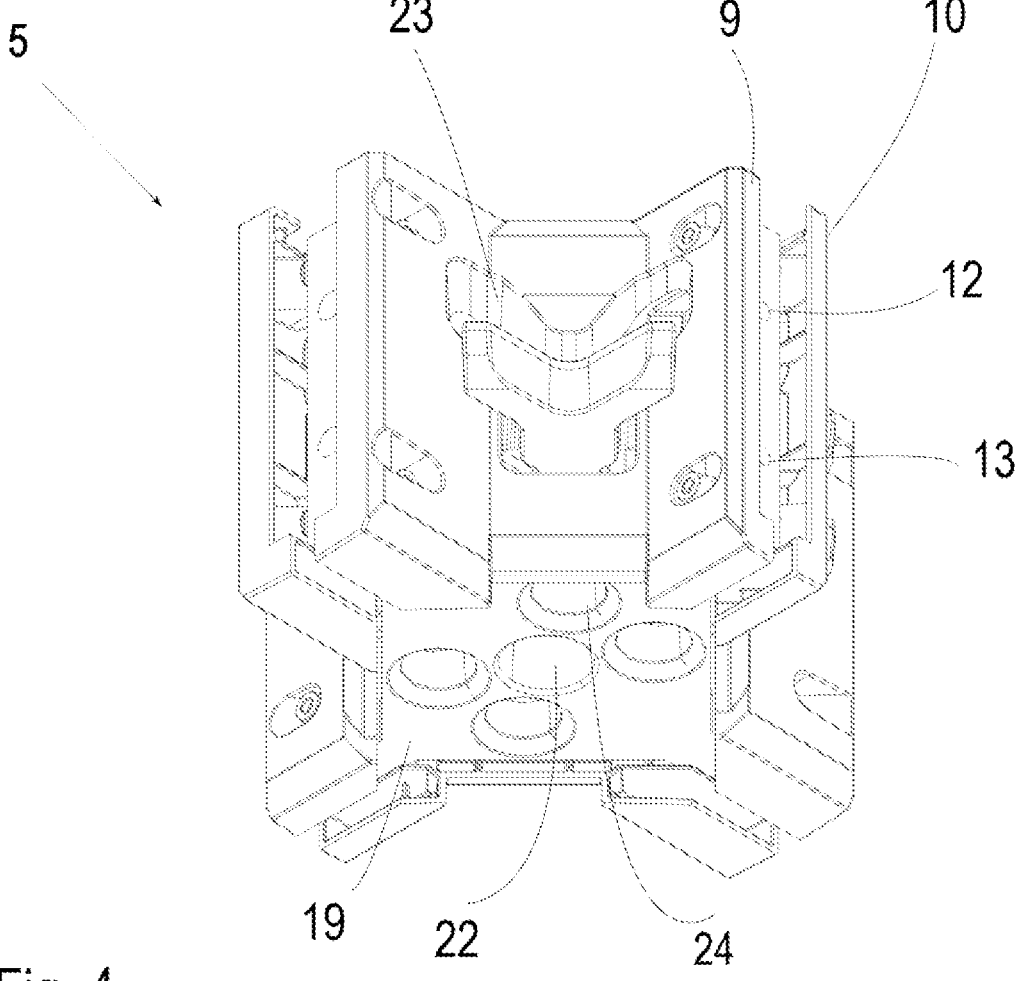
FIG. 4 shows the node element in a perspective view from below.

The frame arrangement 4 has node elements 5 (FIGS. 2 and 3) which are arranged at corners of the container holding spaces, wherein each pair of two adjacent node elements 5 is releasably connected by the same beam 6, 7.

The node elements 5 are all constructed identically. In the case of the beams, however, there are first beams 6 which connect a node element 5 in a first direction to an adjacent node element 5a, and second beams 7 which connect the node element 5 to another adjacent node element 5b in a second direction.

The first beams 6 are longer than the second beams 7. Moreover, the first beams 6 are, for example, thinner than the second beams 7.

The first beams 6 and the second beams 7 are formed as metal sheets which, for example, have a thickness in the range from 5 mm to 30 mm.

The node element 5 has an arm 8 for each beam, and the beam 6, 7 is connected to the arm 8. The node element 5 has a guide 9, 10 for the beam 6, 7 on at least one arm 8. The guide 9, 10 makes it easier to position the respective beams 6, 7 on the node element 5, and thus facilitates the arrangement of the beam 6, 7 on the node element 5, Each beam 6, 7 has a beam end face which is connected to an arm end face 11 (FIG. 3) of the arm 8. Two bores 12, 13 which can be provided with an internal thread are arranged in the arm end face so that the beam 6, 7 can be connected as joining elements by screws 14, 15. In order to be able to install the screws, each beam 6, 7 has a slot-like through-opening 16, 17 for each joining element. The slot-like through-openings 16, 17 extend in the longitudinal direction of the beam 6, 7, and the screws 14, 15 are guided through a web 18 between the through-opening 16, 17 and the beam end face. The screws 14, 15 are designed such that they do not protrude laterally beyond the beams 6, 7. Another type of fastening is also possible, for example a threaded bore in the beam 6, 7 and a corresponding opening in the node element. 5 through which a joining element can be guided.

The node element 5 has a body 19 which is preferably designed as a cast part. The cast part can be designed, for example, as a cast steel, cast aluminum, spheroidal cast iron, or stainless steel casting.

A post 20 (FIG. 1) is arranged between adjacent container holding spaces 2 and stands on the node element 5. The node element 5 thus forms a stand device for the post 20. For this purpose, the node element 5 has a contact surface 21 with a bore 22. The bore 22 can be used to guide lines or other functional elements through the post 20.

A container holding device is arranged between each container holding space 2 and the loading space 3, the container holding device having a flap (pawl) 23 which can be pivoted about a horizontal axis, the flap being mounted in a node element 5. In many cases, such a flap 23 is provided at all four corners of a container holding space 2. However, this is not absolutely necessary. In some cases, it is sufficient to provide such a flap 23 at two diagonally opposite corners.

At its lower side relative to the direction of gravity, the node element 5 has an opening 24 through which a flap actuation mechanism (not shown) acts on the flap 23. The node element 5 can then simultaneously form a guide for the flap actuation mechanism. The position of the opening depends on the type of flap actuation mechanism used.

The flap 23 is held in the node element 5 by a flap holding element 25 fastened in the node element 5. The flap holding element 25 has a recess 26 which is adapted to the shape of the flap 23 and receives the flap 23 when the flap 23 is pivoted from a holding position (shown in FIG. 3) into a release position. In the release position, the flap 23 has been pivoted upward approximately at a right angle to the holding position shown in FIG. 3.

The flap holding element 25 can form an abutment for a closing spring 27 acting on the flap 23.

The flap holding element 25 projects beyond at least one end face 11 and thus forms the guide 9, 10 for the beams 6, 7 described above.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A block stacking arrangement comprising:
   multiple container holding spaces;
   a loading space arranged below the container holding spaces; and
   a frame arrangement arranged between the container holding spaces and the loading space,
   wherein the frame arrangement has node elements that are arranged at corners of the container holding spaces,
   wherein each pair of two adjacent node elements is releasably connected by a same beam, and
   wherein the frame arrangement forms an opening through which containers are moveable from below relative to the direction of gravity from the loading space into the container holding space.

2. The block stacking arrangement according to claim 1, wherein a node element is connected, in a first direction via a first beam, to an adjacent node element and, in a second direction via a second beam, to a further adjacent node element.

3. The block stacking arrangement according to claim 2, wherein the first beam is longer and thinner than the second beam.

4. The block stacking arrangement according to claim 1, wherein the node element has an arm for each beam, and the beam is connected to the arm.

5. The block stacking arrangement according to claim 4, wherein the node element has a guide for the beam on at least one arm.

6. The block stacking arrangement according to claim 4, wherein the beam has a beam end face which is connected to an arm end face of the arm.

7. The block stacking arrangement according to claim 6, wherein the beam has at least one slot-like through-opening extending substantially in the longitudinal direction of the beam, and
   wherein a joining element is guided through a web between the through-opening and the beam end face.

8. The block stacking arrangement according to claim 1, wherein the node element has a body which is formed as a cast part.

9. The block stacking arrangement according to claim 1, wherein a post is arranged between adjacent container holding spaces, and a node element forms a stand device for the post.

10. The block stacking arrangement according to claim 9, wherein the node element has a contact surface with a bore.

11. The block stacking arrangement according to claim 1, further comprising a container holding device arranged between each container holding space and the loading space, and the container holding device having a flap that is pivotable about a horizontal axis,
    wherein the flap is mounted in a node element.

12. The block stacking arrangement according to claim 11, wherein the node element has an opening on its lower side relative to the direction of gravity through which a flap actuation mechanism acts on the flap.

13. The block stacking arrangement according to claim 11, wherein the flap is held in the node element by a flap holding element which is fastened in the node element and which has a recess which receives the flap, when the flap is pivoted from a holding position into a release position.

14. The block stacking arrangement according to claim 13, wherein the flap holding element forms an abutment for a closing spring acting on the flap.

15. The block stacking arrangement according to claim 13, wherein the flap holding element protrudes beyond at least one end face of the node elements.

16. The block stacking arrangement according to claim 1, further comprising a pivotable flap mounted on at least one of the node elements that is operable to allow a container to pass through the opening from the loading space into the container holding space or to pass through the opening from the container holding space into the loading space.

* * * * *